Sept. 7, 1954   F. B. STRATTON   2,688,158
METHOD AND APPARATUS FOR MOLDING STRIPS OF FOAMED LATEX
Filed June 13, 1952
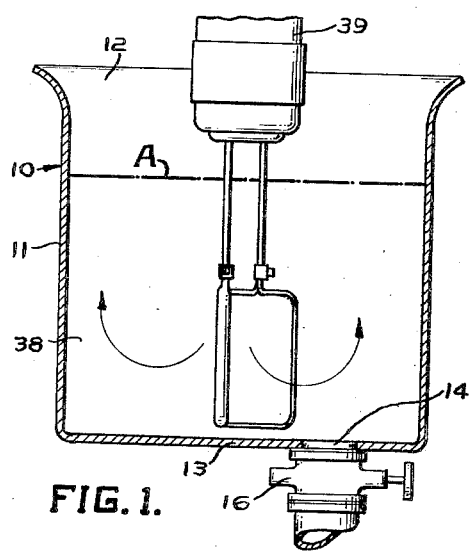
FIG. 1.
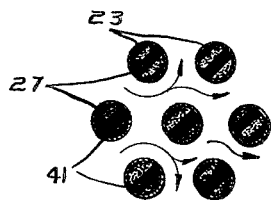
FIG. 3.
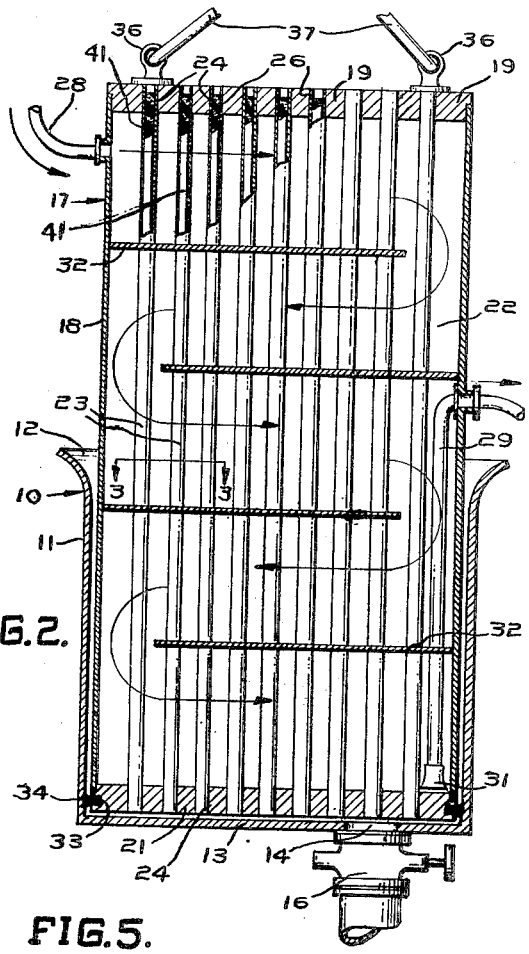
FIG. 2.
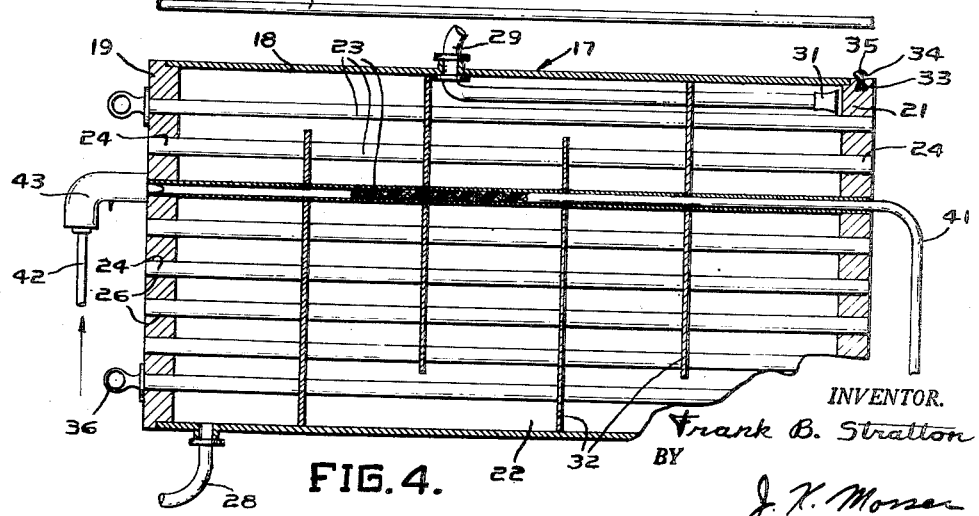
FIG. 5.
FIG. 4.
INVENTOR.
Frank B. Stratton
BY
J. K. Mosser
AGENT Patented Sept. 7, 1954

2,688,158

UNITED STATES PATENT OFFICE 2,688,158

METHOD AND APPARATUS FOR MOLDING STRIPS OF FOAMED LATEX

Frank B. Stratton, Grinnell, Iowa, assignor to The Maytag Company, Newton, Iowa, a corporation of Delaware Application June 13, 1952, Serial No. 293,411

11 Claims. (Cl. 18—26)

The invention relates to a method and apparatus for molding articles and more particularly to a method and apparatus for molding and curing foamed latex articles into various elongated shapes.

It is one of the objects of the invention to provide a simplified method and apparatus for simultaneously molding and then curing a multiplicity of elongated relatively thin foamed latex articles from a single batch of compounded latex.

Heretofore it has been expensive to mold and cure relatively thin and long foamed latex articles because expensive split molds are required. Also, since gelling of the latex is relatively rapid, the uniform distribution of the foamed latex within a plurality of molds prior to gelling presents a difficult production problem, and should the gelled latex be removed from the mold to complete the curing operation damage to some of the cellular structure may result, unless handled with care.

In accordance with the invention, liquid dispersed latex and compounding material is placed in a receptacle and agitated rather violently to incorporate or blend small particles or cells of air into the mixture thereby increasing its volume and producing a foamed mixture. After increasing the volume to a predetermined amount, a gelling agent is blended into the mixture which acts to coagulate the liquid dispersed latex in a relatively short time. A container having a plurality of open-ended, spaced and vertical tubular molding members, each being of substantially uniform cross-section throughout their lengths and anchored in spaced headers, is lowered into the receptacle. With the lower header acting as a plunger or piston the foamed latex is readily forced into and rises uniformly in the tubular members. This operation may be accomplished rapidly before the liquid dispersed latex gels and without undue chances of entrapping air bubbles, other than those incorporated into the mixture during the foaming operation. With the foamed latex uniformly distributed in the vertical tubular members sufficient time is permitted for gelling to take place, after which a heating medium is circulated about the tubular members to cure the product therein. At the end of the curing operation, the container is removed from the receptacle and fluid under pressure is applied to one end of the tubular members to force the cured elongated foamed latex articles longitudinally out of the opposite end.

Accordingly, it is another object of the invention to provide an improved method of producing a plurality of elongated foamed latex articles in a single operation which utilizes tubular molding members of substantially uniform cross-section and elminates split molds or the like.

It is another object of the invention to provide an improved method of molding and curing a plurality of elongated foamed latex articles in a single container having tubular members therein forming individual single piece molds which permits the molds to be filled uniformly without the addition of excessive pressure.

It is yet another object of the invention to provide a method of producing elongated foamed latex articles which eliminates non-uniform texture in the cured product.

It is another object of the invention to provide apparatus for simultaneously producing a plurality of elongated foamed latex articles including molds of non-divisible construction in which both the molding and curing operations are performed.

It is still another object of the invention to provide foamed latex molding and curing apparatus which includes a heated container having a plurality of spaced vertical tubular molding members of substantially uniform cross-section in which the foamed liquid latex is molded and cured and fluid under pressure is applied to the cured latex within the tubular members for removing the same longitudinally therefrom.

It is another object of the invention to provide a simplified method for molding and curing a plurality of foamed latex articles in a single batch which simultaneously and uniformly fills all of the mold cavities in a minimum amount of time and which utilizes fluid under pressure to remove the finished articles at the end of the curing operation.

It is still another object of the invention to provide foamed latex molding apparatus which is simple in construction and may be readily cleaned and inspected.

Other objects, features, capabilities and advantages are comprehended by the invention, as will later appear and as are inherently possessed thereby.

Referring to the drawings:

Figure 1 is a diagrammatic vertical sectional view of an open receptacle having liquid dispersed latex therein in the process of mixing and foaming;

Figure 2 is a diagrammatic longitudinal vertical sectional view of the molding and curing apparatus disposed in the receptacle after the gelling agent has been incorporated in the mixture and with the foamed liquid latex filling the elongated tubular molding members;

Figure 3 is a detail horizontal cross-sectional view of a few of the spaced tubular molding members.

Figure 4 is a diagrammatic longitudinal sectional view of the molding apparatus removed from the receptacle after the curing operation and showing a means for removing the molded and cured foamed latex articles from the tubular molding members; and, Figure 5 is an elevational view of one of the elongated molded and cured foamed latex articles after removal from the tubular molding members.

Referring now to the drawings for a more detailed description of the molding apparatus and method incorporating the steps of the present invention, there is shown in Figure 1 a receptacle 10 of suitable size and construction having a cylindrical side wall 11, an upper open end 12 and a bottom wall 13 with an outlet opening therein 14. This opening is provided with a valve means 16 of any suitable type which may be opened to permit the removal of cleaning material at the end of the molding operation or for the admission of air to break the vacuum, in a manner to be hereinafter described.

As clearly shown in Figure 2, the molding apparatus includes a container 17 comprising an imperforate cylindrical wall or shell 18 and upper and lower tube sheets or headers 19 and 21, respectively, of relatively heavy construction with respect to the shell 18 which cooperate to define a chamber 22. Within this chamber and between the headers 19 and 21 are a plurality of parallel spaced relatively long and narrow open-ended tubes or tubular one piece, non-divisible molding members 23, having their outer ends 24 rolled or welded within mating opening 26 in the headers to provide a fluid type seal therebetween. These tubular molding members are preferably spaced apart, as shown in Figure 3, to permit free circulation of heating fluid therebetween. While the inner peripheries or surfaces 27 of the tubular molding members are shown as circular and of relatively narrow cross-section, it is to be understood that the particular inner contour of the mold may be of any suitable configuration, as long as the cross-section is generally uniform throughout the length of the mold. This is necessary to facilitate removal of the cured molded articles from the non-divisible tubular molding members 23.

In order to supply heat to the chamber 22 to accelerate curing of the molded articles, a steam supply conduit 28 extending from a source of steam (not shown) is secured to the shell 18 of the container adjacent the upper header 19, and a return steam and condensate conduit 29 extending through the shell is provided, in this instance, with its inlet connected to an ejector or eductor construction 31 disposed at the lower end of the chamber 22 above the lower header 21 and its opposite end to a low pressure source (not shown) to automatically or continuously remove the residual steam and the condensate collecting adjacent to the bottom of the chamber. If desired, a series of baffles or tube plates 32 may be disposed in the chamber 22 to not only brace the tubular molding members 23 between the headers, but to insure proper and uniform circulation of the heating fluid about the tubular members. It is to be understood that the heating means for the tubular molding members 23 may be any suitable heating medium which may be controlled within the proper temperature limits.

The outer periphery of the lower header 21 is of smaller diameter than the inner diameter of the side wall 11 of the receptacle 10 and it is provided with an annular radially outwardly opening groove or recess 33 in which is disposed or mounted a liquid sealing means, such as, for example, an annular resilient sealing ring or member 34 having an outwardly projecting sealing surface 35. This sealing surface is adapted to closely contact and wipe the inner periphery of the cylindrical wall 11 of the receptacle to prevent the passage of liquid or fluid therearound. Suitable means, such as, spaced eyebolts 36 mounted on the upper header 19 are adapted to be engaged by a hoisting sling 37 which in turn is connected to suitable mechanism (not shown) for lowering and elevating the container 17 into and out of the receptacle 10.

In the operation of the method for preparing the foamed latex, the container 17 is removed from the receptacle 10 and the proper quantities of water-dispersed latex 38, dispersed accelerators, anti-oxidants, vulcanizing agents and the like are placed in the receptacle. After this, suitable blending and foaming apparatus, such as, a beater mechanism 39 is placed in the mixture within the receptacle, as shown in Figure 1, and operated to disperse and blend or mix all of the ingredients thoroughly, and at the same time include or incorporate into the mixture small bubbles or globules or the like of air to provide a cellular structure. By continued beating, more and more air is dispersed and entrapped in the liquid mixture and, due to the characteristics of the mixture, foaming takes place, which, of course, results in an overall increase in volume. After a sufficiently large amount of air has been uniformly dispersed throughout the mixture in the form of small bubbles or the like to increase its volume to the level marked A which is predetermined to substantially equal the combined volume of the tubular molding members 23, a gelling agent or coagulant is added to the mixture which in turn is quickly dispersed therethrough. From this point on, the operation must move rather quickly in order to have the foamed liquid dispersed latex in the molds before gelling or coagulation occurs.

The beating mechanism 39 is removed from the receptacle 10 and the container 17, suspended by the hoist, with the tubular molding members 23 vertical, is moved into position above the receptacle and lowered vertically downward through its open end 12, as shown in Figure 2. As the container is lowered, the outwardly projecting sealing surface 35 of the sealing element 34 carried about the outer periphery by the lower header 21 contacts the cylindrical side wall 11 of the receptacle to seal the two elements against leakage therebetween.

Upon further downward movement of the container, the air trapped above the level A of the foamed latex flows through the open ended tubular molding members 23 and escapes to the ambient atmosphere at the upper open ends 24 without disturbing the mixture. As the lower header 19 contacts the foamed latex in its downward movement and displaces the same, the header acts as a piston and the foamed latex simultaneously flows or is forced uniformly upwardly through all of the tubular molding members. Since the foamed latex is relatively light in weight, of relatively low viscosity and the open ends of the tubular molds collectively provide a relatively large crosssection to the surface of the latex, only a very low pressure is required to displace the latex from the receptacle 10 vertically upwardly into the tubular molding members 23. This is particularly important because if excess pressure were applied to the foamed mixture, rupture or separation of the individual air cells or bubbles and water may take place and thus break down the thin film separating the air which in turn will result in an unsatisfactory finished product. This same condition may result if the foamed latex is pumped or positively displaced from the receptacle into the molds prior to and after gelling takes place.

When the bottom of the header 21 engages or is stopped adjacent the bottom wall 12 of the receptacle, all of the available foamed latex will have been displaced from the receptacle into the tubular one piece molding members 23, as shown in Figure 2, in a minimum length of time and without undue agitation. The above operation must of necessity take place at a relatively rapid rate, that is, within a few minutes, because should the foamed latex mixture gel in the receptacle it could not be readily forced into the tubular molds without producing an unsatisfactory finished product or change in structure.

Upon displacement of all of the foamed latex into the tubular molds, a time interval is provided to permit the mixture to gel or coagulate to fix the relationship between the air cells or bubbles and latex to thereby prevent or resist further change in cellular structure. After gelling of the mixture takes place, heat is preferably uniformly circulated within the chamber 22 about the exterior of the tubular molds 23 by the baffles 32. In this instance, the heating medium is steam which enters the chamber through the steam conduit 28 adjacent the top header 19, is circulated about the tubes and withdrawn along with the condensate adjacent the lower header 21 through the exhaust conduit 29. The heating of the tubular molds cures the foamed latex therein and, by way of example, steam at approximately 212° F. is circulated about the tubular molds 23 for approximately 10 to 20 minutes. After the latex has been cured for the proper length of time to provide the desired elongated relatively thin strips 41, the valve 16 in the bottom wall 13 of the receptacle is opened and the container 17 is withdrawn vertically from the receptacle by the hoisting means. The opening of the valve prevents a vacuum from being created upon separation of the lower header 21 from the bottom 13 of the receptacle.

Upon removal of the container 17 it is placed in a convenient position and fluid under pressure, such as, for example, air or water, is supplied from a suitable source through a conduit 42 and applied to one of the open ends of each tubular molding member 23 by a suitable portable mechanism 43 having a portion which fits and seals the one open end. Since the foamed latex shrinks slightly and the water separates from the dispersion during the curing operation the separated water acts as a lubricant between the inner wall 27 of the tubular molding members and the outer peripheral surface of the elongated molded articles 41. Thus, the fluid under pressure acting on the one end of the molded foamed latex article 41 forces the same longitudinally through the mold and out of the opposite end. If desired, a fixture may be provided to remove groups of molded strips in one single operation.

After removal of the molded strips 41, they are washed and then dried in the usual manner and are ready for use where desired. The tubular single piece molds in the container and the receptacle are then cleaned, after which the valve 16 is closed and the next batch of latex may be placed in the container and foamed preparatory to molding additional articles.

With an arrangement of this type, simultaneous molding and curing of a relatively large number of elongated relatively thin members or articles 41 of uniform texture or cellular structure may be accomplished. In the example shown a receptacle approximately 30″ in diameter filled to a depth of 30″ of foamed latex in a single batch, is capable of producing approximately 600 foamed latex strips or articles about ¾″ in diameter and 72″ long.

From the foregoing, it can be seen that a method and apparatus has been provided for molding and curing elongated and relatively thin foamed latex articles of generally uniform cross section which is relatively simple in construction and operation, does not require split molds, may mold a multiplicity of similar articles in one operation and that the molding and curing take place sequentially within a single cavity. Also, that from the molding to the end of the curing operation the foamed latex is not disturbed to thereby change its cellular structure, and longitudinal removal of the cured elongated foamed latex articles may be readily accomplished by means of fluid under pressure which is applied to one of the open ends of the tubular molding members or mold cavities.

Some of the important advantages in a construction of this type are the simplicity of the equipment, the relative ease of maintenance and cleaning, and the speed at which a multiplicity of molds may be uniformly filled. This is particularly important since the lapse of time from the addition of the gelling agent into the foamed latex until gelling occurs is relatively rapid, that is, in the order of 2 to 7 minutes. Also, an arrangement of this type is capable of producing large numbers of cured elongated latex articles substantially uniform in cellular structure with a minimum waste of material.

While I have herein described and upon the drawings shown an illustrative embodiment of the invention, it is to be understood that the invention is not limited thereto, but may comprehend other constructions, arrangements of parts, details and features without departing from the spirit of the invention.

It is claimed:

1. Apparatus for molding and curing foamed latex articles, comprising a receptacle for receiving foamed latex in the liquid state, an elongated generally vertical tubular one piece molding member of generally uniform cross sectional area throughout its length having open ends and carrying a header at one thereof to provide a piston, means for moving the header into said receptacle to displace the liquid foamed latex into said tubular molding member through its lower open end, and means for applying heat to the exterior of said tubular molding member to cure the liquid latex.

2. In apparatus for molding and curing foamed latex articles, the combination of a receptacle for receiving liquid dispersed foamed latex, a plurality of generally vertical tubular molding members of one piece construction having upper and lower open ends, means for moving said tubular members into said receptacle to displace the foamed latex into the interior of said tubular members through their lower open ends, and means for heating said tubular members to cure the foamed latex therein.

3. Apparatus for molding and curing foamed latex articles, comprising a receptacle for receiving foamed latex in the liquid state, a movable member comprising a plurality of substantially vertical open-ended one piece molds each having one of their ends secured within a header, means for moving said header and molds into said receptacle with said header displacing the foamed liquid latex in said receptacle into said molds, and means for uniformly heating the exterior of said molds to cure said latex after gelling, said header being removable from said receptacle after curing.

4. In apparatus for curing elongated strips of foamed liquid dispersed latex, the combination of a receptacle having an upper open end for receiving a quantity of foamed latex in the liquid state, a container having upper and lower headers with generally vertical elongated open ended one piece tubular molding members of substantially uniform cross section throughout their length secured to said headers, means for lowering said container into said receptacle to displace the foamed latex upwardly into said tubular molding members, and means for heating the exterior of said tubular members to cure the foamed latex therein.

5. Apparatus for molding and curing elongated strips of foamed latex, comprising a receptacle having an upper open end for receiving a quantity of foamed latex in the liquid state, a container having upper and lower headers, a plurality of elongated generally vertical relatively thin tubular molding members of substantially uniform cross section throughout their length secured at their outer ends to said headers, said container including a shell surrounding said tubular members, means for inserting and removing the lower header of said container into and out of said receptacle, said lower header providing a piston for displacing said foamed liquid latex from said receptacle simultaneously and uniformly into said tubular molding members when said container is lowered into said receptacle, and means for supplying heat to said tubular members within said shell to cure the foamed latex, said first named means being operative to remove the container from said receptacle after curing.

6. Apparatus for molding and curing elongated strips of foamed latex, comprising a receptacle for receiving a quantity of foamed liquid dispersed latex, said receptacle having an upper open end and a bottom wall with a valve communicating therewith, a container having upper and lower headers, a plurality of generally vertical elongated relatively thin tubular one piece molding members of substantially uniform cross section throughout their length rigidly secured to said headers at their upper and lower ends, said container including a cylindrical shell secured to said headers and surrounding said tubular molding members to provide an enclosure therefore, means for inserting and removing the lower header of said container into and out of said receptacle, said lower header providing a piston for displacing the foamed liquid latex from said receptacle simultaneously and uniformly into said tubular molding members when said container is lowered into said receptacle, means for supplying steam to said enclosure to uniformly heat said tubular members to cure the foamed latex, and means for opening said valve after curing, said first named means being then operative to remove the container from said receptacle.

7. Apparatus for molding and curing elongated strips of foamed latex, comprising a receptacle for holding a quantity of foamed liquid dispersed latex, said receptacle including a cylindrical side wall with an upper open end and a bottom wall having an opening therein, valve means for closing said opening, a container having upper and lower headers with said lower header being of smaller diameter than the cylindrical wall of said receptacle, a plurality of generally vertical elongated relatively thin tubular one piece molding members of substantially uniform cross section throughout their length rigidly secured to said headers, said container including a shell surrounding said tubular molding members to provide an enclosure, a sealing element carried by said lower header about its outer periphery, means for inserting and removing the lower header of said container into and out of said receptacle, said sealing element engaging said cylindrical wall to provide a seal when said container is lowered into said receptacle and said lower header providing a piston for displacing the foamed liquid latex from said receptacle simultaneously and uniformly into said vertical tubular molding members, means for supplying steam into said enclosure to uniformly heat said tubular members therein upon coagulation of the foamed latex to cure the same, and means for opening said valve after curing, said first named means being then operative to withdraw said container from said receptacle.

8. The method of producing elongated relatively thin strips of foamed latex, which comprises foaming a body of water dispersed liquid latex, adding a gelling agent thereto, filling a one piece tubular mold by moving the same against the foamed liquid latex before gelling, allowing the foamed latex to gel within the mold, uniformly heating the mold to cure the foamed latex, and forcing the cured articles longitudinally from the mold by fluid under pressure.

9. The method of producing a plurality of elongated relatively thin strips of foamed latex, which comprises foaming a body of water dispersed liquid latex, adding a gelling agent thereto, simultaneously and uniformly filling a plurality of one piece tubular molds by moving them against the foamed latex to displace the same into the molds while still in the liquid state, permitting said foamed latex to gel in the molds, and applying heat to the molds after gelling to cure the foamed latex therein.

10. The method of producing a plurality of elongated relatively thin strips of molded foamed latex, which comprises foaming a quantity of water dispersed latex within a chamber, adding thereto a gelling agent, moving a plurality of one piece elongated forming molds against the foamed latex to displace the same simultaneously and uniformly into the molds while still in the liquid state, permitting said latex to gel within said molds, uniformly heating said molds after gelling to cure said foamed latex, and applying fluid pressure to said formed and cured foamed latex articles at one end of the molds to longitudinally remove the same therefrom.

11. The method of producing a plurality of elongated relatively thin strips of molded foamed latex, which comprises foaming a quantity of water dispersed latex within a chamber, mixing therein a gelling agent after foaming, moving a plurality of one piece tubular molds against the foamed latex within the chamber to displace the latex simultaneously and uniformly into the elongated tubular molds while still in the liquid state, permitting said foamed latex to gel within said molds, uniformly heating said molds after gelling to cure said foamed latex, removing said molds from the chamber, and applying fluid under pressure to said cured elongated foamed latex strips at one end of the molds to longitudinally remove the same therefrom.

References Cited in the file of this patent

UNITED STATES PATENTS

| Number | Name | Date |
|---|---|---|
| 461,721 | Thurfelder | Oct. 20, 1891 |
| 683,862 | Petit | Oct. 1, 1901 |
| 1,409,925 | Calderwood | Mar. 21, 1922 |
| 1,912,637 | Harper | June 6, 1933 |
| 2,085,959 | Donegan | July 6, 1937 |
| 2,310,830 | Blair et al. | Feb. 9, 1943 |
| 2,320,583 | Forro | June 1, 1943 |
| 2,341,499 | Cunningham | Feb. 8, 1944 |
| 2,354,433 | Carter | July 25, 1944 |
| 2,361,026 | Greene | Oct. 24, 1944 |